April 6, 1948.    H. L. DONICHT ET AL    2,438,905
AUTOMATIC COMPENSATING GUN CONTROL SYSTEM
Filed April 18, 1941    3 Sheets-Sheet 2

April 6, 1948.    H. L. DONICHT ET AL    2,438,905
AUTOMATIC COMPENSATING GUN CONTROL SYSTEM
Filed April 18, 1941    3 Sheets-Sheet 3

INVENTORS
HARRY L. DONIGHT
RICHARD F. FISCHER
ERNEST B. BALDRIDGE
BY
ATTORNEYS

UNITED STATES PATENT OFFICE 2,438,905

AUTOMATIC COMPENSATING GUN CONTROL SYSTEM

Harry L. Donicht, Richard F. Fischer, and Ernest B. Baldridge, Dayton, Ohio

Application April 18, 1941, Serial No. 389,200

10 Claims. (Cl. 89—41)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to novel gun sighting and elevating control mechanism particularly adapted to control the guns on an aircraft.

It is well known in the aircraft art that the angle of attack of the lifting surfaces of an airplane with respect to the relative wind, changes with change in the air speed of the airplane and if, for example, the airplane is in level flight at a particular air speed and the engine throttle is opened, the nose will drop and the wing will assume a lesser angle of attack until the lift just equals the weight of the airplane and conversely the angle of attack will increase as the engine throttle is closed, causing a decrease in air speed. This change in angle of attack will also occur due to changes in air speed resulting from a climb or dive in a similar manner. In other words, the longitudinal axis of the airplane will make an angle with respect to the path of the center of gravity of the craft dependent on the instant value of air speed.

In the mounting of fixed guns and sights on an airplane, it has been the practice to adjust the axis of the same to be parallel to the line of flight for some assumed air speed of best performance and this system is fairly satisfactory where the effective range of the guns is small, but since the advent of higher caliber guns and cannon having greatly increased effective ranges of fire, the lack of compensation for the change in the elevation and the line of sight due to the change of the angle of the longitudinal axis of the airplane with change in air speed, has become a serious problem. A further need for compensation arises in the case of large caliber machine guns and small cannon, having effective ranges greater than five hundred yards because of the change in trajectory with increasing range, requiring that the guns be given superelevation of an amount dependent upon the range of the target object.

The present invention relates to means for providing compensation of the above types comprising means for changing the elevation angle of the normally fixed guns and the line of sight with respect to the longitudinal axis of the airplane as the said axis shifts with respect to the flight path due to changes in air speed, the said means being under the control of a device responsive to changes in air speed. The invention further provides a sighting device operable to compute the range of a target object and effective to control the elevation of one or more of the guns to compensate for the variation in trajectory with variation in range. The second-named compensating system is arranged to act jointly with the first-named system so that both compensations may be effected substantially simultaneously.

The invention further provides a means actuated by the range computing device for rendering the firing device of certain guns inoperative when the range of the target objects is beyond the effective range of the said certain guns.

The principal object of the invention is the provision of control apparatus for controlling the elevation of the guns of an aircraft and the like and for controlling a sighting device associated therewith such that the plane of the guns and line of sight remain substantially parallel to the instant flight path irrespective of changes in air speed.

A further object of the invention is the provision in a gun elevation control system of the character described in which means are provided for maintaining the guns and line of sight of a gun sight associated therewith parallel with the instant flight path of the associated aircraft, of means associated with the gun sight for computing the range of a target object and compensating means actuated by said range computing means for effecting a further change in the elevation of certain of said guns to compensate for the change in trajectory with change in range of the target object.

Another object of the invention is the provision in a compensating gun control system of the character described, of a gun sighting device, a range computing device associated therewith and means actuated by said range computing device for rendering certain of said guns inoperative when the computed range exceeds the effective range of said certain guns.

A further object of the invention is the provision of a gun sighting device for use on aircraft in which said sight is tiltably mounted and controlled by air speed responsive means, so that the line of sight remains parallel with the instant flight path irrespective of the inclination of the longitudinal axis of the aircraft to the flight path due to changes in air speed.

Another object of the invention is the provision of a sighting device for use on aircraft having means for maintaining the line of sight substantially parallel to the instant flight path, and range computing means associated with said sighting device for computing the range of a target object in a plane parallel to the line of sight of said sighting device.

Other objects of the invention not specifically enumerated above will appear by reference to the detailed description in the specification and to the appended drawings in which.

Figure 1:
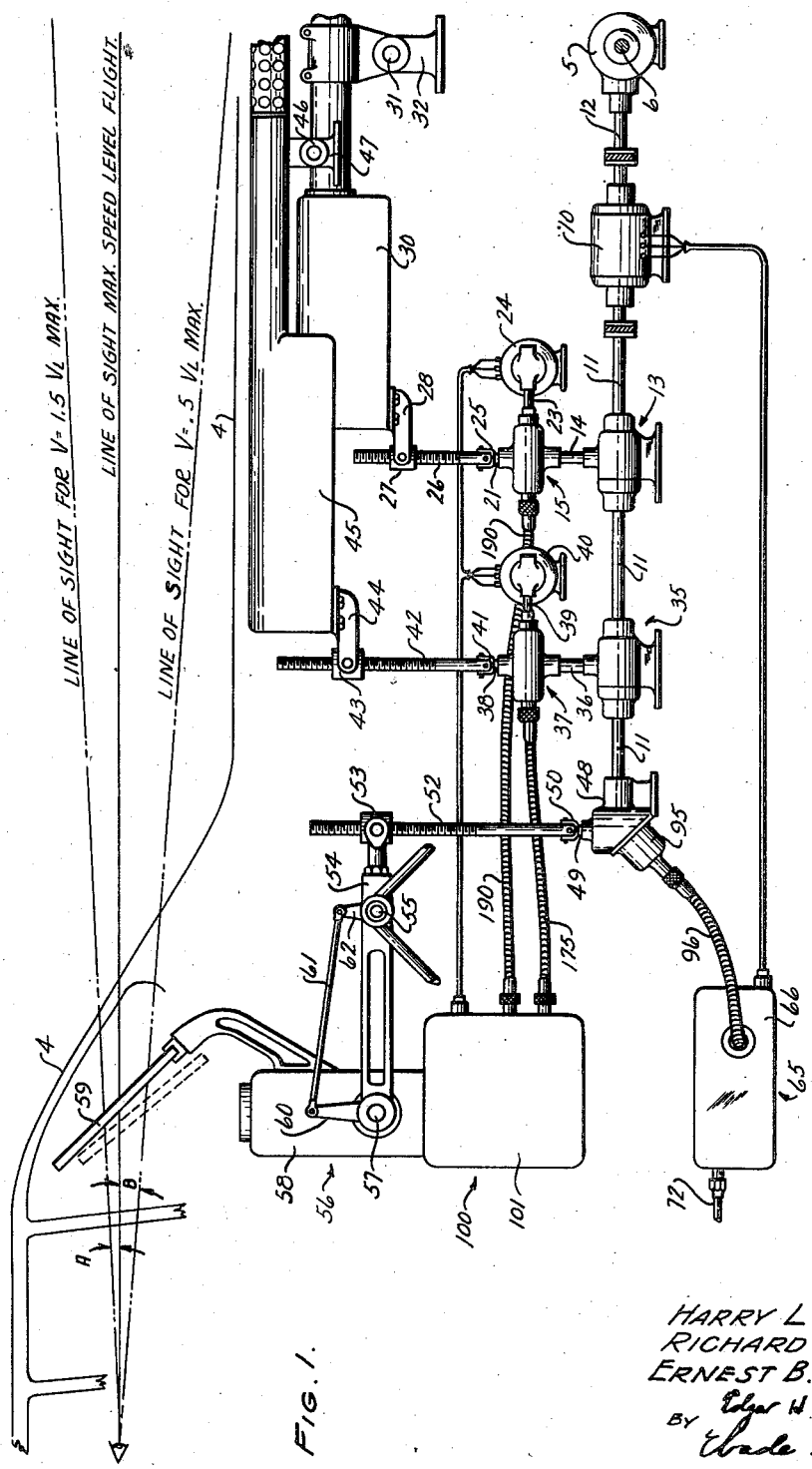
Figure 1 is an assembly view illustrating the components of the novel gun control system in accordance with the invention.

Referring now to the general assembly drawing, Figure 1, the reference numeral 4, indicates the fragmentary outline of an aircraft on which the armament and control system therefor hereinafter described, is mounted. In the control system as illustrated, the reference numeral 10 indicates a reversible electric motor of a commercially available type incorporating therein a solenoid actuated brake (not shown) which is adapted to be released automatically whenever the motor is energized and to be engaged to brake the motor shaft whenever the motor is de-energized. The motor 10 is adapted to drive a pair of shafts 11 and 12 respectively, each of which is adapted to actuate a gun elevating mechanism as will now be explained. The shaft 11 is adapted to drive by means of a conventional bevel gear drive unit 13, a shaft 14 connected to one side of a conventional two-way drive differential unit generally indicated by the reference numeral 15, which differential is adapted to impart the drive from the shaft 14 to a shaft 21 which is connected by means of a universal joint 25 to a threaded shaft or lead screw 26. The shaft 21 is also adapted to be driven in either direction through the differential unit 15 from a shaft 23 driven by a reversible geared-head electric motor 24. By means of the differential 15, the lead screw shaft 26 may be rotated from the motor 10 or motor 24 depending upon which motor is energized and it is also possible to drive the shaft 26 with a total angular displacement resulting from the respective independent drives from the motor 10 and motor 24. The lead screw shaft 26 is adapted to raise or lower a nut 27 threadably mounted thereon and secured by trunnions to an arm 28 to cause the same to be raised or lowered with the nut 27. The arm 28 is adapted to be secured to the breech of a gun 30 which may be of the cannon type, such as the well-known 37 millimeter type, the cannon being pivotally mounted by trunnions 31 journalled in a conventional mounting support 32. It is thus seen that as the arm 28 is raised or lowered by means of the nut 27, the angle of elevation of the gun will be correspondingly changed.

The shaft 11 is also adapted through the medium of a conventional bevel gear drive 35 to drive a shaft 36 in either direction, which shaft is adapted to drive through the two-way drive differential 37 a shaft 38 which is connected by means of a universal joint 41 to a threaded lead screw shaft 42. The differential unit 37 is identical in construction and operation to the previously-described differential unit 15 and is operative to impose a second drive on the shaft 42 from a shaft 39 driven by a geared-head reversible electric motor 40. The lead screw shaft 42 is adapted to raise or lower a nut 43 mounted thereon and pivotally connected to an arm 44 secured to the breech portion of each of a pair of 50 caliber machine guns mounted on either side of the cannon 30 only one of which is illustrated in the drawings. The guns 45 are mounted in trunnions 46 journalled in the supporting brackets 47 so that the angle of elevation of the guns 45 will be changed as the nut 43 is raised or lowered by the lead screw 42. The gun 30 and guns 45 may be mounted in an aircraft fuselage such that they may fire through the plane of the propeller, the firing being controlled by a synchronizing mechanism (not shown) and forming no part of the present invention.

The shaft 11 is also adapted to drive by means of a conventional bevel gear drive 48 and vertical shaft 49, connected by means of a universal joint 50 to a vertical lead screw 52, the latter being adapted to raise or lower a nut 53 mounted thereon and pivotally connected to the outer end of an arm 54. The arm 54 is supported by pivots 55 in suitable journals carried by a mounting structure secured to the aircraft fuselage. The outer portion of the arm 54 is formed as a fork to support a gun sighting mechanism generally indicated by the reference numeral 56, the latter being pivotally mounted on the arm by means of the pivots 57. The gun sight 56 includes a conventional optical projection apparatus 58 for optically projecting reference index lines from an illuminated reticule through suitable lens systems onto a known type of transparent reflector 59, the latter being supported from the sight 56. The pilot or gunner is adapted to directly view the target object through the transparent reflector 59 and at the same time to orientate the target object with reference to the optically projected reference lines, images of which will appear on the reflecting surface of the reflector 59. A lever 60 is rigidly connected to the pivots 57 and at its outer end is pivotally connected by means of a link 61 to a stationary lever 62 suitably supported by the mounting brackets for the arm 54. As the nut 53 is raised or lowered by rotation of the lead screw 52, the arm 54 will correspondingly depress or elevate the sighting device 56 with respect to pivots 55, and the levers 60, 61 and 62 are of such a design that the angle of the reflector 59 with respect to the line of sight from the gunner's eye will always remain constant.

The motor 10 is adapted to be energized by suitable electrical circuits under the control of an air speed responsive device generally indicated by the reference numeral 65 and enclosed within the casing 66. The air speed responsive mechanism 65 is operative to energize the motor 10 to run in a desired direction to cause a change in elevation of the guns 30 and 45 and an alteration in the line of sight of the sighting device 56. After the motor 10 is rotated through a number of revolutions sufficient to cause the desired change in gun elevation and in the line of sight, the follow-up drive from the shaft 11 comprising a bevel gear drive unit 95 connected to flexible shaft 96, is operative through switching mechanism, hereinafter described, to de-energize the motor 10 which causes a braking of the shafts 11 and 12.

The shaft 12 previously mentioned as driven by motor 10, is adapted through the medium of the bevel gear drive 5 to drive a shaft 6 which may extend transversely of the aircraft fuselage into the wings and serve as a means for actuating gun elevating mechanism of the same character as bevel gear drive 48, lead screw 50 and nut 53, employed for elevating the sighting mechanism 56, to thereby change the elevation of any desired number of guns mounted in the wing structure so as to be adjustable in elevation, such guns not being shown in Figure 1.

The necessary superelevation for the guns 30 and 45 to compensate for the change in trajectory with alteration in range of the target object, is respectively obtained by means of the motors 24 and 40, which are adapted through the medium of the respective differentials 15 and 37 to rotate the lead screws 26 and 42 independent of the rotation thereof caused by motor 10 through the medium of shaft 11 and the respective bevel gear drives 13 and 35. The motors 24 and 40 are adapted to be energized under the control of a range computing and control device generally indicated by the reference numeral 100 mounted in the casing 101 secured to and forming a part of the gun sight 56. The range computing mechanism 100 is operative to energize the motors 24 and 40 to cause the elevation of the guns 30 and 45 respectively to be altered to give the proper amount of superelevation to compensate for the change in the projectile trajectory with change in range of the target object. The motors 24 and 40 are adapted to be controlled through a suitable switching mechanism hereinafter more fully described which forms a part of the range computing device 100. A follow-up flexible cable drive 175 is provided to transmit the motion of the control motor 40 to the switching mechanism controlling the energizing thereof, so as to de-energize the motor 40 after the necessary superelevation correction has been imposed on the gun 45, and a similar flexible shaft follow-up drive 190 is provided for transmitting the motion of the motor 24 to the switching mechanism controlling the energizing thereof, to de-energize the motor after the necessary superelevation correction has been made on the gun 30.

A detailed description of the mechanism and control therefor for changing the angle of elevation of the guns and altering the line of sight of the gun sighting device, necessary because of the change in the line of flight of the associated aircraft with change in velocity or air speed, and illustrated in Figure 2, will now be described.

Figure 2:
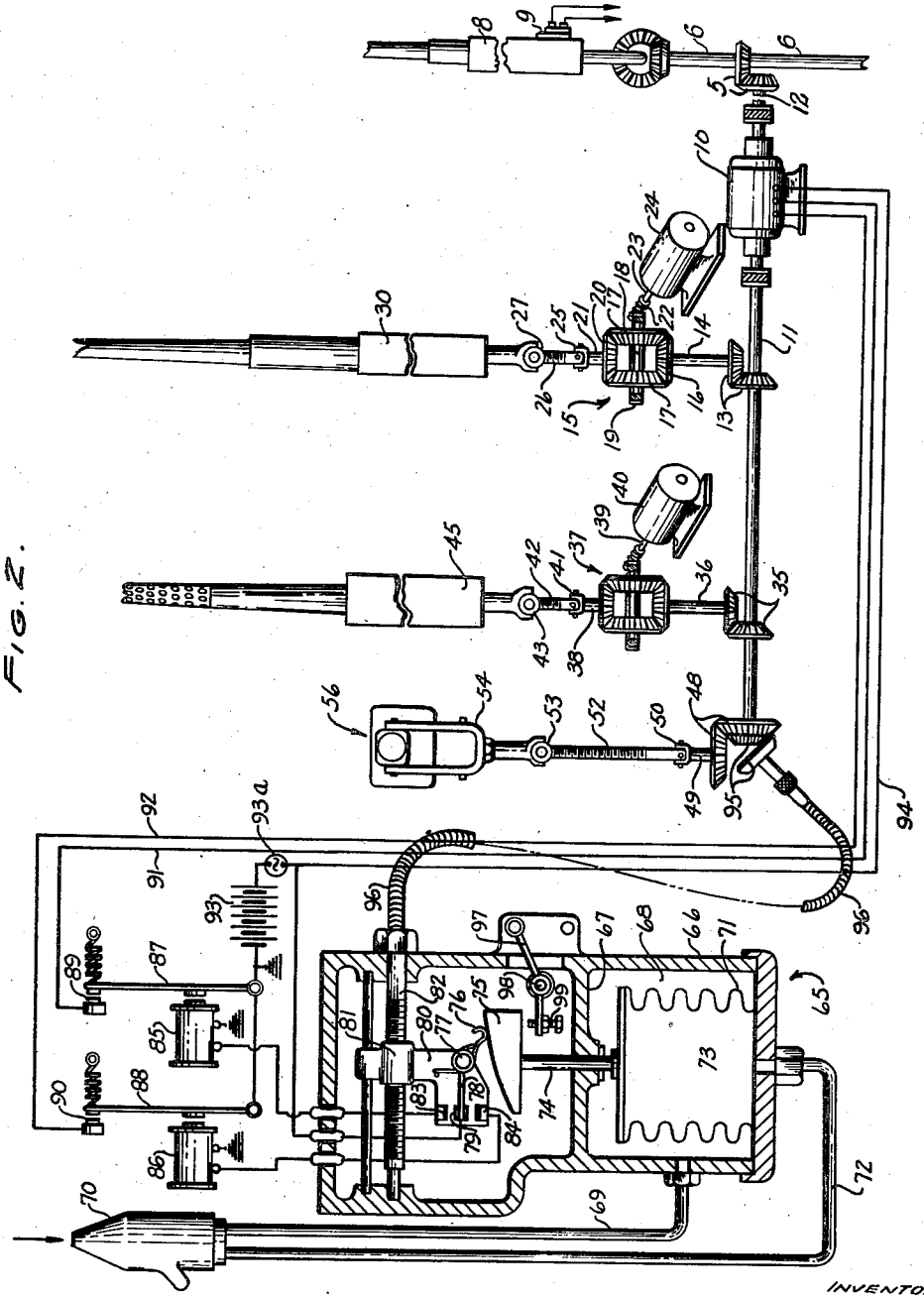
Figure 2 is a diagrammatic detail illustration of the gun elevation and sight control means of the control system of Figure 1.

Referring now to Figure 2, the air speed responsive control device generally indicated by the reference numeral 65 previously mentioned, includes a casing 66 closed at each end thereof and divided by means of a transverse partition wall 67 to form a closed chamber 68 which is in communication by means of a conduit 69 with the static-pressure connection of a conventional pitot static head indicated by the reference numeral 70, and adapted to be mounted on the aircraft in a position so as to be responsive to the changes in air speed thereof. The chamber 68 has arranged therein a resilient metal bellows 71 closed at each end thereof and adapted to form a sealed chamber 73 which is in communication by means of the conduit 72 with the dynamic-pressure connection of the pitot static head 70, so that the bellows 71 is expansible in accordance with the difference in pressure between the conduits 69 and 72 and thus varies as a function of the instant air speed of the associated aircraft. The bellows 71 is adapted to actuate a control rod 74 secured thereto and projecting through the wall 67 of the casing 66 and having a control cam 75 mounted on the outer end thereof. The contour of the cam 75 is designed in accordance with the known variation in the angle of the longitudinal axis of the aircraft with respect to the instant line of flight for different air speeds, and of course is suitably modified for the characteristics of each different type of aircraft in which the control mechanism is to be employed. The cam 75 is adapted to be in contact with a spring-urged cam follower 76 pivotally mounted as at 77 and adapted to actuate a control switch arm 78 having a contact 79 at the outer end thereof adapted upon alternate movement of the switch arm to engage either of a pair of relay contacts 83 and 84 spaced on opposite sides thereof. The cam follower 76, switch arm 78 and contacts 83 and 84 are supported on a guided transversely movable carriage 80 adapted to be shifted by a nut 81 integrally formed therewith and cooperating with a threaded follow-up lead screw 82. The relay contacts 83 and 84 are respectively electrically connected to relay coils 85 and 86 which when energized are adapted to respectively attract the power relay arms 87 and 88 to close either of a pair of contacts 89 and 90 respectively associated therewith. The contacts 89 and 90 are respectively connected by means of conductors 91 and 92 to the split field coils or other electrical reversing means of the motor 10 and a battery or other source of current supply 93 has one terminal thereof connected to the relay arms 87 and 88 and through a grounded connection to the other sides of the relay coils 85 and 86, and the battery has the other terminal thereof electrically connected to the switch arm contact 79 by means of a conductor 94 also connected in a well-known manner to the armature circuit of the motor 10. The control circuit is operative such that when the contacts 79 and 84 are engaged, the relay coil 86 will attract the armature or relay arm 88 to close the contacts 90, thereby establishing an electrical circuit from the battery 93 through the conductors 92 and 94 causing the motor 10 to run in one direction. Upon the contacts 79 and 83 becoming engaged, the relay coil 85 is operative to attract the relay arm 87 to close the contacts 89 to establish an electrical circuit from the battery 93 through the conductors 91 and 94 to the motor 10 to cause the motor to run in the opposite direction from that previously mentioned.

It is to be understood, however, that other types of relay mechanism than that shown may be employed for controlling the reversal of the motor 10 which need not necessarily be of the split field type since any suitable type of electric motor capable of being reversed will be satisfactory.

As the cam 75 is shifted up or down in accordance with the variation in air speed of the associated aircraft under the opposing control of the resilience of bellows 71, to thereby cause the contact 79 to engage either of contacts 83 or 84, to cause the energizing of motor 10 to run in a desired direction, the motor 10 will upon being energized drive the shafts 11 and 12 previously mentioned. The shaft 12 is adapted to drive through the medium of bevel gear drive 5 a shaft 6 extending transversely of the aircraft and adapted to cause a change in elevation of a plurality of wing-mounted machine guns 8 having electric firing mechanisms 9 and preferably of the 30 caliber type adjustable in elevation as previously mentioned, only one of such guns being illustrated in the drawing. The shaft 11 as it rotates, through the medium bevel gear unit 13, causes a rotation of the shaft 14 to drive the bevel gear 16 of the differential unit 15, previously noted. The gear 16 is adapted to cause rotation of the bevel-type planet pinions 17 which are rotatably mounted on a carrier 18 which is secured to and rotatable with an orbit gear 19. When the orbit gear 19 is relatively stationary, the rotation of the pinions 17 will cause rotation of the bevel gear 20 meshing therewith to cause rotation of the shaft 21, which through the universal joint 25 causes the lead screw 26 to raise or lower the nut 27 to cause a change in elevation of the gun 30 as previously described. Since as was previously noted, it is necessary to impart a superelevation correction to certain of the guns to compensate for a change in trajectory with change in range, this correction is accomplished by providing a worm gear 22 which meshes with the orbit gear 19 of the differential 15 and is adapted to impart rotation thereto from a shaft 23, driven by the control motor 24, previously described. By rotating the gear 19, the shaft 21 may be rotated independent of the rotation imparted thereto by the shaft 14 and consequently an additional elevation correction through the medium of lead screw 26 may be imparted to the gun 30 so that the resultant change in elevation thereof compensates for the change in angle of the longitudinal axis of the aircraft with respect to the flight path as well as for the change in trajectory due to the change in range of the target object.

In a similar manner, the rotation of the shaft 11 in the given direction will through the medium of the bevel gear drive 35 cause a rotation of the shaft 36 which through the differential unit 37 may drive the shaft 38 and universal joint 41 to rotate the lead screw 42 to raise or lower the nut 43 to cause a corresponding change in the elevation of the guns 45, illustrated as a single gun for purposes of simplicity, to correct for the change in angle of the longitudinal axis of the airplane with respect to the line of flight thereof as the air speed is increased or decreased. The differential unit 37 is constructed exactly in the same manner as the previously described differential unit 15 and is adapted to impart a superelevation correction to the lead screw 42 by means of a worm meshing with the orbit gear of the differential and driven by means of a shaft 39 from the previously mentioned reversible control motor 40.

The shaft 11 is also operative as previously noted through bevel gear drive 48 to drive the vertical shaft 49 which through the universal coupling 50 drives the lead screw 52, which thereby raises or lowers the nut 53 thereon to cause a change in elevation of the gun sighting device 56 so that the line of sight is shifted in the direction opposite the sense of the angular change of the longitudinal axis of the aircraft with respect to the instant line of flight thereof.

It is thus seen that by means of the motor 10 and drives associated with the shafts 11 and 12, it is possible to change the angle of elevation of the guns as well as to alter the line of sight of the gun sighting mechanism so that the plane of fire of the guns and of the line of sight will be changed with change in air speed of the associated aircraft.

In order that the motor 10 may be de-energized after rotating the shafts 11 and 12 in an amount sufficient to make the desired change in elevation of the guns and the line of sight, the follow-up connection between the shaft 11 and the follow-up lead screw 82 is provided, comprising the bevel gear drive 95 and the flexible shaft 96 connecting the gear drive to the follow-up lead screw 82. If, for example, the air speed should increase above the air speed for maximum performance causing a nosing down of the aircraft with respect to the flight path, the increase in dynamic pressure will be transmitted to the chamber 73 in the bellows 71 causing the cam 75 to be elevated and causing a closing of the contacts 79 and 84 which through the power relay elements 86, 88 and 90 will cause the motor 10 to be energized to run, for example, in a counterclockwise direction driving the shaft 11 and causing through the medium of the differentials 15 and 37 and bevel gear drive 48 respectively, a rotation of the lead screws 26, 42 and 52 respectively in a direction so as to cause a downward feeding movement of the nuts 27, 43 and 53 respectively associated therewith to thereby cause the guns to increase the angle of elevation and the line of sight to be shifted upward through, for example, the angle A (Figure 1) to compensate for the nosing down of the aircraft due to increase in air speed, so that the plane of fire of the guns and the line of sight will remain parallel with the line of flight of the aircraft, the shaft 12 making a similar compensation in the angle of elevation of the guns 8 through the bevel gear drive 5 and elevating mechanism controlled by the shaft 6. While the motor 10 is causing the necessary adjustment in the angle of elevation of the guns and shifting the line of sight, the bevel gear drive 95 and follow-up cable connection 96 will cause a counterclockwise rotation of the follow-up lead screw 82 which will cause a feeding motion of the nut 81 and carriage 80 axially to the left as seen in Figure 2 an amount sufficient to allow the breaking of the engagement between the contacts 79 and 84 when the desired elevation adjustment has been made and to de-energize the motor 10 and the solenoid brake control as previously mentioned will stop further rotation of the shafts 11 and 12 and leave the guns in the adjusted position. With respect to the guns 30 and 45, the control motors 24 and 40 will, of course, be operative to impose a further change in elevation necessary to compensate for the change in trajectory in accordance with the range of the target object. If, for example, the air speed of the aircraft should become less than that determined for best performance condition, the dynamic pressure in the bellows 71 will be decreased and the bellows will tend to collapse due to the resilience thereof tending to restore the bellows to a predetermined initial length and the spring-loaded cam follower 76 will cause engagement between the contacts 79 and 83 to thereby energize the motor 10 to rotate in a direction opposite that previously mentioned and cause the angle of elevation of the guns 8, 30 and 45 to be decreased an amount sufficient to offset the increase in angle between the longitudinal axis of the aircraft and the instant flight path, the line of sight of the sighting device 56 being shifted downwardly through, for example, the angle B as seen in Figure 1 to compensate for the nosing up of the longitudinal axis of the aircraft with respect to the flight path as the air speed is decreased so that the plane of fire of the guns and the line of sight will again remain parallel with the instant flight path of the aircraft. The bevel gear drive 95 and follow-up flexible shaft 96 will then rotate the lead screw 82 in the opposite direction from that previously mentioned and cause a feeding movement of the nut 81 and carriage 80 axially toward the right until the cam follower is elevated an amount sufficient to disengage the contacts 79 and 83 to stop the motor 10 in the correct adjusted position. As previously noted the contour of the cam 75 must be so designed to take in account the variation in angle of the longitudinal axis of the aircraft with respect to the flight path of each particular air speed so that the change in elevation of the guns and alteration in the line of sight caused by the rotation of the motor 10 will exactly correspond to the change in angle of the longitudinal axis of the aircraft with respect to the instant line of flight.

In order to provide for a manual control to override the automatic control and maintain the guns and gun sight in a predetermined initial position, a lever 97 is provided extending through the casing 66, pivoted within the casing as at 98 and provided at its outer end with an adjustable screw 99, adapted to be brought into engagement with the underside of the cam 75 to raise the cam to the position corresponding to the initial ground setting of the guns. The pilot closes the engine throttle or throttles an amount sufficient to cause a decrease in air speed below the air speed corresponding to the initial setting of the guns and then actuates the lever 97 either directly or through a suitable remote control to lift cam 75, causing the elevation of the guns and line of sight to be shifted to the initial setting. The pilot may then actuate a switch as indicated at 93a to cut out the power supply and render the automatic air speed responsive control system inoperative. The manually controlled lever 97 may also be employed to actuate the gun elevation control on the ground to adjust the line of sight for the maximum level flight air speed at the altitude of best performance.

Figure 3:
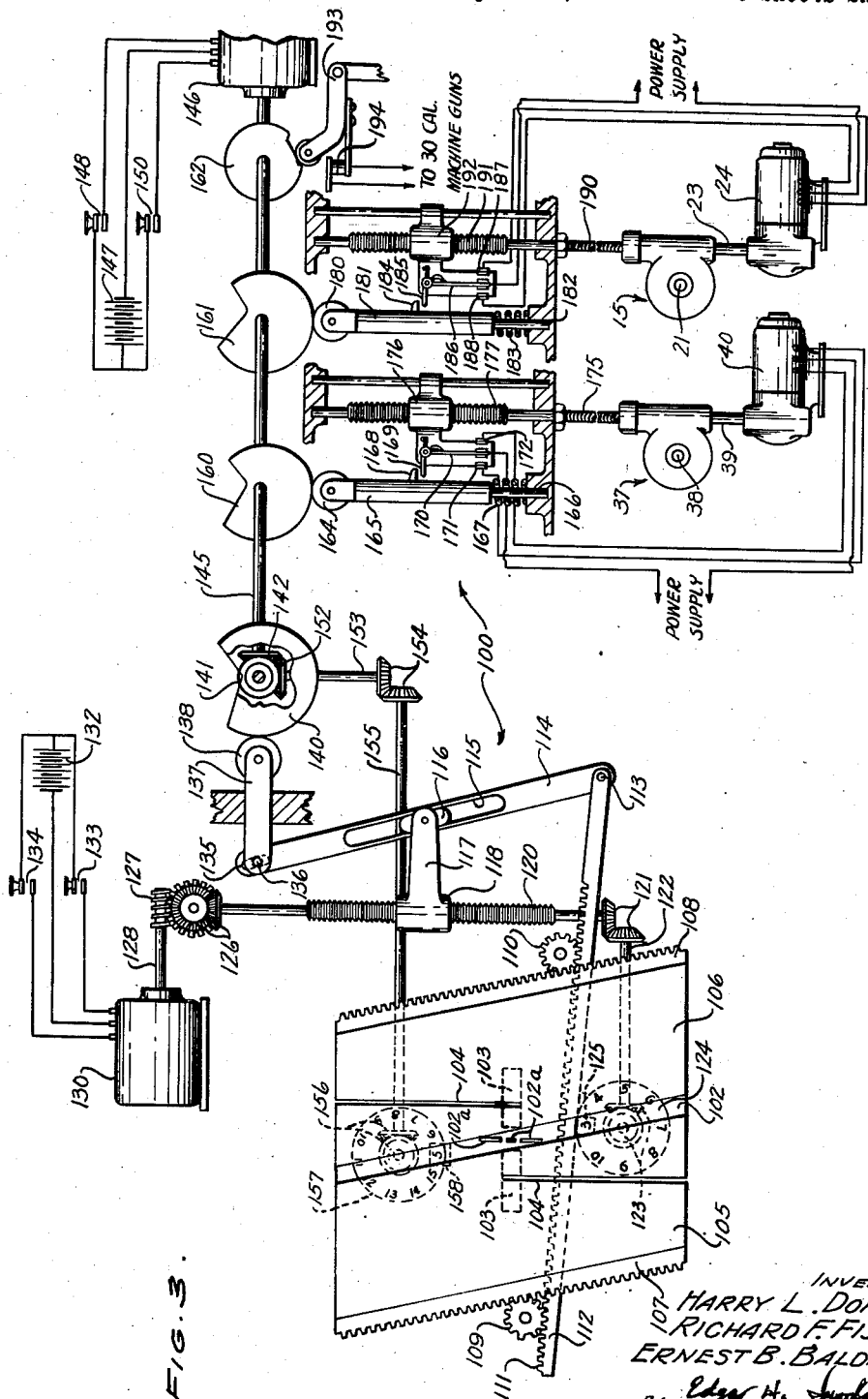
Figure 3 is a diagrammatic illustration of the range computing mechanism and controls actuated thereby in the control system of Figure 1.

It is thus seen that there is provided in accordance with the invention, a means for maintaining the plane of fire of the various guns on an aircraft and the sighting device therefor and the line of sight of the gun sight associated therewith always parallel to the instant flight path irrespective of the change in velocity of the associated aircraft and the novel means for computing the range of the target object and for introducing a compensating superelevation in certain of the guns to compensate for the variation in trajectory with variation in range of the target object as illustrated in Figure 3, which will now be described.

Referring now to Figure 3, the range computing and control mechanism generally indicated by the reference numeral 100 and adapted to be enclosed in the casing 101 associated with the gun sight generally indicated by the reference numeral 56 as shown in Figure 1, comprises a generally opaque shield 102 adapted to be positioned over a suitable light source (not shown) located below the projecting device 58 in Figure 1. The shield 102 is provided with transparent slits 102a through which light may pass to transmit the image thereof to the reflecting surface of the mirror 59 of Figure 1 to serve as center reference and aiming marks. The shield 102 is also provided with transparent window openings 103 respectively positioned on opposite sides of the reference openings 102a and also adapted to allow light from the light source, not shown, to pass therethrough. A pair of shiftable screens 105 and 106 are respectively located on opposite sides of the center openings 102a and each is provided with a slot 104 adapted to allow light to pass therethrough from the window openings 103 of the shield 102 and to have the image created thereby transmitted to the mirror 59 of Figure 1 to serve as stadia reference lines thereon. The screens 105 and 106 are respectively provided with racks 107 and 108 which mesh the respective pinions 109 and 110, the teeth of the latter meshing with the teeth 111 of the shiftable rack 112, the latter being pivotally connected at its outer end to the lower end of a computing lever 114, so that as the rack 112 is shifted in one direction or the other, the slots 104 on the screens will move either toward or away from the central slits 102a in the shield 102 and cause a corresponding movement in the stadia reference lines on the mirror 59 in Figure 1. The computing lever 114 is provided with an elongated slot 115 which serves as a guide for a rotatable pivot support 116 pivoted on the outer end of a lever 117 which is integrally formed with a nut 118 to form a shiftable carriage adapted to be moved along a lead screw 120 so as to adjust the point of rotation of the computer lever 114. The lead screw 120 is adapted through bevel gears 121 and a shaft 122 to drive bevel gears 123 and cause rotation of a transparent disc 124 placed beneath a window opening 125 in the shield 102. The disc 124 is provided with suitable opaque indicia thereon so that the image of the indicia in register with the window opening 125 will be transmitted by the projecting means incorporated in the projection apparatus 58 of Figure 1 to appear upon the reflecting surface of the reflector 59 of Figure 1 as a span-setting indication. The lead screw 120 is adapted to be rotated in either direction by means of bevel gears 126 driven by means of the worm 127 from the shaft 128 of a reversible electric motor 130, the motor 130 being adapted to be electrically connected to the power supply such as a battery 132 and energized to run in either direction by manual actuation of either of the switches 133 or 134, the latter being preferably mounted on the control stick or control wheel of the aircraft for alternate operation by the pilot. By actuating either of the switches 133 or 134, the operator may cause the rotation of the lead screw 120 to thereby cause a rotation of the disc 124 until an indication of the known span of the target object appears in the reflector 59 of the gun sight 56 of Figure 1. Rotation of the lead screw 120 also positions the pivot element 116 relative to the axis of the computer lever 114 to thereby determine the lever arm thereof with respect to the rack 112. At its upper end the computer lever 114 is provided with an elongated slot 135 to receive a pivot pin 136 connecting the lever to a plunger 137 having a cam follower roller 138 mounted on the outer end thereof and adapted to engage the surface of a cam 140. The cam 140 is adapted to be driven by means of a bevel gear 141 driven from a bevel gear 142 mounted on a shaft 145 which is adapted to be driven in either direction by means of a manually-controlled reversible electric motor 146 electrically connected to a power source such as the battery 147 and controlled by means of the manually-actuated switches 148 and 150 which may be actuated, for example, by rotation of the handle grip on the upper end of the control column of the aircraft in either direction respectively. Bevel gear 152 is also arranged to be driven by the shaft 145 from the bevel gear 142 and in turn drives shaft 153 which through bevel gears 154, shaft 155 and bevel gears 156 is adapted to rotate a transparent disc 157 located beneath the shield 102 to bring suitable range-indicating indicia thereon to register with the transparent window opening 158 provided in the shield 102 and the image of the indicia appearing in the window opening 158 also being transmitted to the reflecting surface of the gun sight reflector 59 of Figure 1 along with the image of the indicia on the previously mentioned span-setting disc 124.

The operation of the range-computing mechanism thus far described is as follows:

When the operator observes a target aircraft to be attacked, by knowledge of the type of aircraft which is to be the target object, he may energize the motor 130 to cause the disc 124 to be rotated in a direction such that the indicia corresponding to the known span of the target object will be registered with the window opening 125 of the shield 102 to thereby cause the image of such indicia to appear on the gun sight reflector 59. This operation on the part of the operator also sets the pivot point for rotation of the computing lever 114. The operator then closes either of switches 148 or 150 to cause rotation of the motor 146 in the proper direction until the stadia reference lines visible on the reflector 59 of Figure 1 just span the image of the target object seen by direct vision through reflector, the rotation of the shaft 145 causing the screens 105 and 106 to be shifted toward or away from each other to cause the images thereof forming the stadia reference lines on the reflector to move until the target object image is just spanned. The visual indication of the range of the target object will then appear on the reflector due to the rotation of the disc 157 in proportion to the rotation of shaft 145. The contour of the cam 140 is so determined that when the slots 104 are positioned so that the image of the stadia reference lines just spans the image of the target object seen in the gun sight reflector and the point of pivotation on the computer lever 114 has been set in accordance with the known span of the target object, the cam follower 138 and plunger 137 will rotate the upper end of the lever 114 about the pivot of the element 116 to cause a rotation of the lower end of the computer lever, thereby shifting the rack 112 to the right or left as the case might be, to cause rotation of the respective pinions 109 and 110 which thereby cause through the racks 107 and 108 a respective feeding movement of the screens 105 and 106 either toward or away from each other and when the image of the screen slots 104 cause a movement of the stadia reference lines on the gun sight reflector 59 of Figure 1 until they just span the image of the target object, the image of the indicia of the disc 157 appearing on the gun sight reflector 59 of Figure 1 will give the true range of target object.

It is thus seen that there is provided a novel mechanism for computing the range of a target object when the span of the target object is known, and it is also seen that the amount of rotation of the shaft 145 for a given span-setting position of the pivot support 116 also bears a definite relation to the true range of the target object and this fact is utilized in controlling the necessary superelevation correction on certain of the guns when the range of the target object is beyond five hundred yards, when the need for such compensation then becomes important. This compensation mechanism will now be described.

As seen in Figure 3 in addition to the cam 140 there are also provided on the shaft 145 three additional cams 160, 161 and 162 respectively. The cam 160 is adapted to engage a roller-type cam follower 164 which is pivotally mounted on the outer end of a plunger 165 slidably mounted on a fixed guide stem 166 and yieldingly urged by a spring 167 to maintain contact between the cam follower 164 and the cam 160. The plunger 165 is provided with a projection 168 which is adapted to engage the lever 169 associated with a pivotally mounted spring-urged switch arm 170 having a suitable contact mounted on the outer end thereof. The biasing-spring force on the switch arm 170 is such as to always maintain engagement between the lever 169 and the projection 168. The contact on the switch arm 170 is adapted to engage either of a pair of contacts 171 or 172 located on opposite sides thereof to thereby control the energizing of the compensating motor 40, which as previously noted above in the description of Figures 1 and 2, is adapted through the medium of shaft 39 driven thereby and the differential 37 to cause a change in elevation of the gun 45 independent of the compensation for change in angle of the longitudinal axis of the aircraft with change in air speed. The switch mechanism including the switch arm 170 and contacts 171 and 172 are mounted on a movable carriage 176 adapted to be moved parallel to the plunger 165 by means of the follow-up lead screw 177, adapted to be driven directly from the shaft 39 so that the motion thereof is proportional to the change in elevation of the gun 45 produced by the shaft 38 driven by differential 37. As the shaft 145 is rotated from an initial position an amount proportional to the range of the target object, the cam 160 rotates and allows the projection 168 on the plunger 165 to be moved thereby allowing the lever 169 and spring-urged switch arm 170 to rotate about their pivot point on the carriage 176 so that the contact on the switch arm 170 will engage either of contacts 171 or 172 to energize the motor 40 to rotate in a proper direction to impose a superelevation correction on the gun 45 through the medium of differential 37. While the motor 40 is rotating to produce the necessary correction, the follow-up flexible shaft 175 causes a proportional rotation of the lead screw 177 to feed the carriage 176 in a direction such that the switch arm 170 will be rotated back toward its neutral position and at the instant that the motor 40 has made the necessary correction, the contact on the switch arm 170 will become disengaged with either contact 171 or 172 as the case might be, stopping the motor 40 and leaving the gun 45 in the adjusted position with its angle of elevation compensated for the change in trajectory with change in the computed range. The contour of the cam 160 is so determined that for each angular position of the shaft 145 corresponding to a particular range beyond five hundred yards, the cam will cause the plunger 165 to be positioned to operate the switch mechanism to cause the motor 40 to introduce the proper compensation into the elevation angle of the associated gun or guns 45.

The cam 161 is adapted to be in continuous engagement with cam-follower roller 180 mounted on the outer end of the plunger 181 which is slidably mounted on the fixed stem 182, the plunger being urged by a compression ring 183 to maintain the follower roller 180 in contact with the cam 161. The plunger 181 is provided with a projecting lug 184 adapted to cooperate with an arm 185 to actuate a spring-biased switch control arm 186 to cause engagement of the contact carried thereby with either a pair of contacts 187 or 188 spaced on opposite sides thereof and adapted to control the energizing of the compensating motor 24 previously described with reference to Figures 1 and 2 in the same manner as the motor 40 is controlled, the motor 24 being operative through the medium of the differential 15 to drive the shaft 21 and introduce a superelevation correction into the gun 30, Figure 1, as previously described. The follow-up flexible cable drive 190 connects the shaft 23 to the lead screw 191 to cause a feeding movement of the carriage 192 on which the contact mechanism is supported, to interrupt the flow of current to the motor 24 after an elevation adjustment has been made as determined by the contour of the cam 161. The operation of the control of the motor 24 is exactly similar to that previously described with reference to the control of the compensating motor 40. The contour of the cam 161 is made such that the proper change in elevation angle of the 37 millimeter cannon 30 will be made in dependence upon the range of the target object beyond five hundred yards.

It has been found from practice that there is little need for providing superelevation compensation in light caliber machine guns such as the guns 8 (Figure 2) and further the effective range of such guns is generally limited to a range not exceeding five hundred yards, so that in the control system as illustrated no provision is made for introducing superelevation compensation in such guns. However such compensation, if decided as being necessary, could be provided in the same manner as illustrated with reference to guns 30 and 45.

In order to conserve ammunition when the computed range is more than five hundred yards as determined by the rotation of the shaft 145, the cam 162 rotated thereby is operative to depress a pivoted lever 193 to open the contacts of a circuit controlling switch 194 of an electric firing mechanism such as indicated at 9 in Figure 2 associated with the 30 caliber machine guns and hence rendering these guns inoperative for ranges in excess of five hundred yards.

In order to render the superelevation control system inoperative it is only necessary to operate the motor 146 until the range indicated is less than five hundred yards causing the motors 24 and 40 respectively to actuate the elevating mechanism of the respective guns 30 and 45 to cancel any superelevation correction therein. By means of a suitable switch (not shown) the power supply to motors 24 and 40 may be cut out to render the same inoperative to effect a change in gun elevation.

Brief resume of the operation of the gun control system of Figure 1 taken in conjunction with the detailed construction of the control mechanisms illustrated in Figures 2 and 3, will now be considered.

Upon installation of the control system in the aircraft 4, the initial line of sight of the sighting device 56 and the initial plane of fire of the respective guns 8, 30 and 45 are arranged to make an angle with the longitudinal axis of the airplane equal to the known angle of the line of flight of the airplane with respect to the longitudinal axis thereof for the maximum level flight air speed of the airplane at the altitude of best performance and when adjusted in this position, the contacts 79 and the contacts associated with the control switch arms 170 and 186 respectively are in the neutral position out of engagement with their associated motor control contacts. As the airplane takes off and proceeds on its mission, its air speed will be dependent upon the engine throttle setting and also on whether or not the aircraft is climbing or descending, and as previously noted for every value of air speed there will exist a definite angle between the instant line of flight and the longitudinal axis of the aircraft such that if the plane of fire of the guns and the line of sight of the gun sight are to remain parallel with the instant line of flight, then the elevation of the guns must be increased to compensate for the nosing down of the aircraft with respect to the line of flight as its air speed is increased and vice versa, the angle of elevation of the guns and the line of sight must be shifted in the opposite direction if the air speed of the aircraft becomes less than that selected for maximum performance and by the mechanism described in Figure 2, it is seen that by means of the air speed responsive control device 65, the elevation of the guns and the control of the line of sight is automatically adjusted to remain parallel to the line of flight of the aircraft irrespective of changes in air speed. At this point, it should be understood, however, that the changes in angle of attack of the aircraft with respect to the line of flight has no reference to the angle of a line of flight with respect to the ground, i. e., in the instant control device, all compensation is made relative to the line of flight or path of the center of gravity of the aircraft, and not with reference to a fixed horizontal reference plane. The maximum range of compensation equal to the sum of angles A and B in Figure 1 which are purposely illustrated to an exaggerated degree, will seldom amount to more than about 3° for high speed pursuit type airplanes and the maximum value for any aircraft for ranges in speed between one-half and one and one-half times the maximum level flight speed at the altitude of maximum performance will seldom exceed 5°.

While the aircraft is proceeding on its mission, and the plane of fire of the guns and line of sight of the gun sight are automatically maintained parallel to the instant line of flight, when the pilot comes within range of a target aircraft, it becomes necessary to determine the actual range of the target object in order to obtain the maximum effective fire from the airplane's armament. This range is computed from the known dimensional characteristics of the particular type of target airplane by controlling the span-setting factor of the computing mechanism and position of the stadia measuring reference lines projected by means of the projector 58 from the illuminated reticule comprising the shield 102 and screen elements 105 and 106 previously described, Figure 3, and after determining the range of the target aircraft, the range computing mechanism illustrated in Figure 3 then becomes operative, if the computed range exceeds five hundred yards, to superimpose a superelevation compensation into the elevation setting of the guns 30 and 45 and simultaneously to prevent the guns 8 from firing by opening the firing-control circuit switch 194 (Figure 3), the guns 30 and 45 may be fired as desired. If the computed range be less than five hundred yards, the firing circuit or circuits to the guns 8 will become operative and the entire battery of guns may be fired. As previously noted, the manual control means 97 and 99 may be actuated to cause the air speed elevation control means to return the guns to their initial setting irrespective of the changes in air speed to there remain upon de-energizing of the main power supply for the air speed adjusting motor 10, and by setting the range computing mechanism and de-energizing the superelevation compensating motors 24 and 40, the guns can be operated in the same manner as in the present aircraft installations.

While in the invention as illustrated, rigid shafts are employed for driving the air speed elevation compensating means, it is to be understood that such a result may be equally well obtained by the use of separate motors connected to the respective gun elevating control means, a single switch controlled by the air speed responsive device as illustrated in Figure 2 being employed to control one of the motors and the remaining motors having their controls connected by means of follow-up connections to be actuated by the single control motor thus eliminating the possibility of the separate motors getting out of step due to the varying inertia effects of the different types of guns since such electrical connections are well known in the art and employed, for example, in controlling separate motors driving the rolls of paper mills and the like, such electrical driving means is considered the equivalent of the mechanical drive herein illustrated and consequently no separate illustration of the electrical driving means employing separate motors has been made in the drawings.

While preferred form of gun compensating mechanism has been illustrated and described, various changes and modifications therein will become apparent to those skilled in the art as coming within the scope of the invention as defined by the appended claims.

We claim:

1. In combination with an aircraft, a gun mounted thereon, adjusting means for varying the angle of elevation of said gun with respect to the longitudinal axis of said aircraft, a first power means for actuating said adjusting means, control means for said first power means responsive to changes in air speed of the aircraft for controlling the actuation of said adjusting means to maintain the plane of fire of said gun substantially parallel with the instant flight path of said aircraft, a second power means for causing an additional change in elevation of said gun and control means for such second power means adapted to be set in accordance with the computed value of the range of a target object so as to control the second power means to provide the necessary superelevation of said gun corresponding to the computed range of the target object.

2. In combination with an aircraft, a plurality of guns mounted thereon, adjusting means for varying the angle of elevation of each of said guns with respect to the longitudinal axis of said aircraft, reversible power means for actuating said adjusting means, control means responsive to changes in velocity of said aircraft for controlling said power means to maintain the plane of fire of said guns substantially parallel with the instant flight path of said aircraft and separate means independent of said power means and associated with each respective gun adjusting means to cause an additional variation in the elevation thereof to compensate for the change in trajectory with the computed value of the range of a target object.

3. The structure as claimed in claim 1, including a range finder having a range computing mechanism associated therewith, a power control means actuated by said computing mechanism and an operative connection between said second power means and the power control means actuated by said computing mechanism to cause operation of said second power means to provide the said superelevation of said gun in accordance with the value of the computed value of the range of the target object.

4. In an aircraft gun control system, a plurality of guns each adjustable to vary the angle of elevation thereof with respect to the longitudinal axis of the aircraft, a sighting device having the angle of elevation of its line of sight adjustable with respect to the longitudinal axis of the airplane, power means having a plurality of power control elements operatively associated with the guns and sighting device to vary the angle of elevation of the guns and the line of sight with respect to the longitudinal axis of the aircraft, control means for said power means responsive to variation in air speed to normally maintain the plane of fire of said guns and the line of sight of said sighting device substantially parallel with instant flight path of said aircraft, range computing mechanism associated with said sighting device and operative to position each of said plurality of power control elements in accordance with the computed range of a target object, and independent power means associated with each respective gun and operatively connected to a respective one of said power control elements to cause an independent change in the angle of elevation of each respective gun dependent upon the characteristics of its trajectory with respect to the computed range.

5. In a gun control system of the character described, a gun controllable in angle of elevation with respect to a reference axis, adjustment means for varying the angle of elevation of the gun, a two-way drive differential mechanism operatively connected to said adjustment means to actuate the same, a first reversible power means connected to said differential for actuating said adjustment means, control means for said first power means including pressure-responsive means responsive to change in air speed, said control means being operative to control the energizing of said first power means to maintain the plane of fire of said gun substantially parallel to the plane of motion thereof, a second reversible power means operatively connected to said differential to actuate said adjustment means independent of said first power means, control means for said second power means, range computing mechanism associated with said gun for computing the range of a target object including an element positioned in accordance with the computed value of the range of a target object, and an operative connection between said element and the control means for said second power means, whereby said second power means is energized to effect an additional change in the angle of elevation of said gun of a magnitude dependent on the computed value of the range of a target object.

6. The structure as claimed in claim 5, including follow-up means connecting said second power means and the control means therefor and operative to de-energize the second power means after the latter has effected a change in the angle of elevation of the gun determined by the computed value of range.

7. In an aircraft having a plurality of guns mounted thereon, adjusting means associated with each gun for changing the angle of elevation thereof with respect to the longitudinal axis of the aircraft, two-way drive differentials respectively associated with certain of said adjusting means, first power means for actuating said adjusting means and forming one of the drives for said differentials, air speed responsive means for controlling said first power means to maintain the plane of fire of each of said guns substantially parallel with the instant line of flight of said aircraft, range computing mechanism for computing the range of a target object, second power drives respectively connected to said differentials to form independent means to actuate the said certain adjusting means, power control means for controlling said second power drives, said power control means being actuated by said range computing mechanism and operative to cause a change in the elevation of certain of said guns to compensate for the variation in trajectory with change in range of the target object.

8. The structure as claimed in claim 7, including follow-up connections between each of said differentials and said power control means to de-energize said second power drives upon a change in elevation of certain of said guns of a magnitude determined by the computed range of the target object.

9. In combination with an aircraft, a plurality of guns mounted thereon, each of said guns having adjusting means associated therewith for varying the angle of elevation of the gun with respect to the longitudinal axis of the aircraft, power means for actuating said adjusting means, air speed responsive control means for controlling said power means to maintain the plane of fire of said guns substantially parallel with the instant flight path of said aircraft, a range finding device for determining the range of a target object, said range finding device including computing mechanism having an element positioned in accordance with the computed value of the range of the target object, and means actuated by said element for preventing the firing of certain of said guns when the computed value of range exceeds a predetermined value.

10. In combination with an aircraft, a plurality of guns mounted thereon, each of said guns having adjusting means associated therewith for varying the angle of elevation of the gun with respect to the longitudinal axis of the aircraft, power means for actuating said adjusting means, air speed responsive control means for controlling said power means to maintain the plane of fire of said guns substantially parallel with the instant flight path of the aircraft, a range finding device for determining the range of the target object, said range finding device including computing mechanism having an element positioned in accordance with a computed value of the range of the target object, means actuated by said element for preventing the firing of certain of said guns when the computed value of the range exceeds a predetermined value, other of said guns than said certain guns having separate power means associated with the adjusting mechanism thereof and operative to cause a compensating change in the angle of elevation of the associated respective guns independent of said first-named power means to compensate for the change in trajectory with change in range of the target object, control means for said separate power means, and a connection between the said element of said computer and said last-named control means whereby said control means causes the energizing of said separate power means to effect a compensating change in the angle of elevation of said other guns.

HARRY L. DONICHT.
RICHARD F. FISCHER.
ERNEST B. BALDRIDGE.

REFERENCES CITED

The following references are of record in the file of this patent:

UNITED STATES PATENTS

| Number | Name | Date |
| --- | --- | --- |
| 1,481,248 | Sperry | Jan. 15, 1924 |
| 1,724,093 | Kauch et al. | Aug. 13, 1929 |
| 2,034,223 | Brady | Mar. 17, 1936 |
| 2,044,340 | Trimbach | June 16, 1936 |
| 2,155,389 | Arden | Apr. 25, 1939 |
| 2,183,530 | Alkan | Dec. 19, 1939 |
| 2,246,632 | Lanciani | June 24, 1941 |

FOREIGN PATENTS

| Number | Country | Date |
| --- | --- | --- |
| 438,956 | Great Britain | Nov. 22, 1935 |
| 800,484 | France | May 4, 1936 |
| 809,090 | France | Dec. 3, 1936 |